Patented Nov. 17, 1942

2,302,135

UNITED STATES PATENT OFFICE 2,302,135

DERIVATIVES OF THE CYCLOPENTANO-POLYHYDROPHENANTHRENE SERIES AND PROCESS OF PRODUCING SAME

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application July 26, 1938, Serial No. 221,437. In Switzerland August 16, 1937

4 Claims. (Cl. 260—397.5)

According to this invention alcohols of the saturated and unsaturated cyclopentanopolyhydrophenanthrene series or derivatives thereof are made by causing to act on compounds of this series containing in the side chain ethylene oxide rings, agents capable of splitting ethylene oxide compounds by reduction, and treating the alcohols thus formed if desired with esterifying or etherifying agents.

The cyclopentanopolyhydrophenanthrene nucleus contained in the parent materials may be saturated or unsaturated and furthermore may be substituted, for example by substituted or unsubstituted hydroxyl, hydrocarbon, amino or carboxyl groups or by halogen atoms, oxide rings or keto-groups or their enol derivatives in any desired steric positions. The parent materials may be derived, for example, from androstane, pregnane, estrane or hydro-estrane or their stereoisomers, homologues and partial dehydrogenation products. Such parent materials are obtainable, for example, from compounds having corresponding ethylene linkages in the side chains by the action of a per-acid, or by splitting off hydrogen halide from the corresponding halogenhydrins. The halogenhydrins themselves are obtainable, for example, from the ethylene compounds by addition of hypohalogenous acid or from aldehydes by reaction with halogen carboxylic acid derivatives. The unsaturated ethylene linkages on which the ethylene oxide rings are based can be fixed semicyclically to the cyclic frame (cf. for example Formula A) or they may be entirely in the side chain and in the latter case either be linked directly to the nucleus (cf. for example Formula B; $x=0$) or also be separated from it by one or more carbon atoms (cf. for example Formula B; $x=1,2,3 \ldots$)

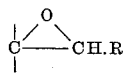

Formula A

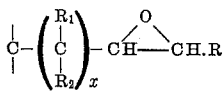

Formula B

The opening of the oxide ring by a reduction process to produce an alcohol may be conducted in manner itself known, for example by means of an amalgam, an alcoholate such as aluminium or magnesium alcoholate and a secondary alcohol, or an alkali metal and an alcohol, or by means of hydrogen catalytically activated, for example by a metal, or it may be conducted by an electrolytic or biochemical method. Oxide groupings or other reduceable substituents in the nucleus may also undergo reduction at the same time. It is also possible to open the oxide ring reductively by the addition of an organo-metallic compound, such as an organo-magnesium halide, especially by a more energetic action of such a compound. In the alcohols thus obtained the residue of the organo-metallic compound has moreover entered into $\alpha$-position. Finally it is possible to conduct the reductive opening of the oxide ring indirectly: If, for example, hydrocyanic acid is added to the $\alpha$-oxide there is obtained a $\beta$-hydroxynitrile which, if desired, may be saponified directly and decarboxylated.

The compounds containing new hydroxyl groups obtained in one or other of these ways may then be converted in manner itself known by the action of esterifying and etherifying agents into their ethers or esters of, for example, carboxylic acids or hydrohalic acids.

The products of the cyclopentanopolyhydrophenanthrene series obtainable in accordance with the present invention, therefore, may contain for example the grouping of the formula

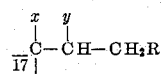

wherein $x$ and $y$ stand for a member of the group consisting of a free, an esterified and an etherified hydroxyl group and R stands for a member of the group consisting of hydrogen, a substituted and an unsubstituted hydrocarbon radical and a cyanogen group.

They may find application in therapeutics or serve as intermediate products for the manufacture of therapeutically valuable compounds.

The following examples illustrate the invention, the parts being weight:

*Example 1*

1 part of the oxide of 17-ethenyl-3-acetoxy-androstanol-(17) of the formula

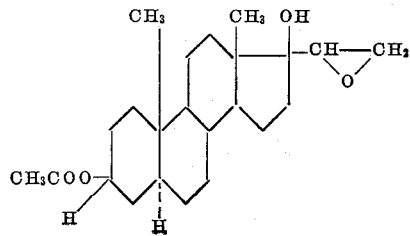

obtainable from androsterone is dissolved in 100 parts of hot amyl alcohol and reduced by the gradual addition of 3 parts of sodium. Then the alcohol is evaporated to a considerable extent at a low temperature under reduced pressure, dilute acid being added to compensate for the increasing concentration of alkali. Finally the residual alcohol is distilled with steam and the residue is extracted with ether. The ethereal solution is washed with a small quantity of water, dried and evaporated, whereby there is obtained the 3-epi-allo-pregnane-triol-(3:17:20) of the formula

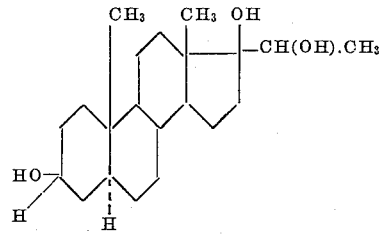

In analogous manner there may be also obtained unsaturated compounds, for example $\Delta^{4:5}$-3-keto-17:20-dioxy-pregnenes. In this case it is advantageous to apply biochemical methods of reduction.

*Example 2*

1 part of the dioxide of $\Delta^{5:6}$-17-ethenyl-3:17-diacetoxyandrostene of the formula

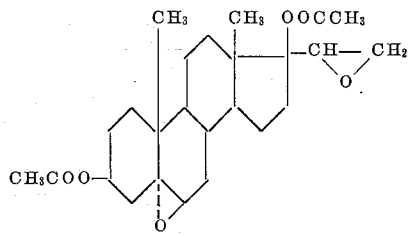

(prepared from trans-dehydroandrosterone by addition of acetylene in presence of ammonia, partial reduction, acetylation and treatment with per-benzoic acid) is hydrogenated in glacial acetic acid solution in presence of palladium black as catalyst until the quantity of hydrogen absorbed corresponds with that calculated for 2 equivalents. The whole is then filtered to remove the catalyst, the filtrate is diluted with water and extracted with ether. The residue from the ethereal solution is esterified by allowing it to stand overnight at room temperature together with a mixture of 5 parts of benzoyl chloride and 20 parts of pyridine. On the following morning the reaction product is precipitated, washed, recrystallized from alcohol and the 5-hydroxy-3.17-diacetoxy-20-benzoxy-pregnane of the formula

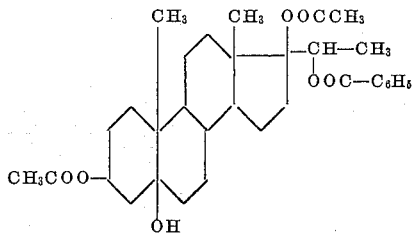

is thus obtained.

What we claim is:

1. A process for the manufacture of derivatives of the saturated and unsaturated cyclopentanopolyhydrophenanthrene series, which comprises splitting the ethylene oxide ring of a compound of this series carrying in 17-position a side chain containing an ethylene oxide ring, with the aid of an agent capable of splitting the oxide ring, and then reacting the resultant product with a member of the group consisting of an esterifying and an etherifying agent.

2. A process for the manufacture of derivatives of the saturated and unsaturated cyclopentanopolyhydrophenanthrene series, which comprises treating a compound of this series carrying in 17-position a side chain containing an ethylene oxide ring with a reducing agent capable of splitting the oxide ring, and then with a member of the group consisting of an esterifying and an etherifying agent.

3. In a process for the manufacture of derivatives of the saturated and unsaturated cyclopentanopolyhydrophenanthrene series, the step of treating a compound of this series carrying in 17-position a side chain containing an ethylene oxide ring with a reducing agent capable of splitting the oxide ring.

4. In a process for the manufacture of derivatives of the saturated and unsaturated cyclopentanopolyhydrophenanthrene series, the step of treating a compound of this series carrying in the 17-position the side chain

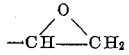

and a member of the group consisting of a free, an esterified and an etherified hydroxyl group, with a reducing agent capable of splitting the oxide ring.

KARL MIESCHER.
ALBERT WETTSTEIN.